(12) United States Patent
Kennedy (10) Patent No.: US 12,517,636 B2
(45) Date of Patent: Jan. 6, 2026

(54) INTELLIGENT SURGICAL DISPLAY SYSTEM AND METHOD

(71) Applicant: SoftAcuity, Inc., Santa Barbara, CA (US)

(72) Inventor: Bruce Laurence Kennedy, Santa Barbara, CA (US)

(73) Assignee: SoftAcuity Inc., Santa Barbara, CA (US)

( * ) Notice: Subject to any disclaimer, the term of this patent is extended or adjusted under 35 U.S.C. 154(b) by 0 days.

(21) Appl. No.: 18/170,475

(22) Filed: Feb. 16, 2023

(65) Prior Publication Data
US 2023/0266872 A1     Aug. 24, 2023

Related U.S. Application Data (60) Provisional application No. 63/311,916, filed on Feb. 18, 2022.

(51) Int. Cl.
| | | |
|---|---|---|
| *G06F 3/04845* | (2022.01) | |
| *G16H 40/67* | (2018.01) | |
| *H04N 13/239* | (2018.01) | |

(52) U.S. Cl.
CPC ......... *G06F 3/04845* (2013.01); *G16H 40/67* (2018.01); *H04N 13/239* (2018.05)

(58) Field of Classification Search
CPC .... G06F 3/04845; G16H 20/40; G16H 30/20; G16H 40/20; G16H 40/63; G16H 40/67; H04N 13/239; H04W 24/04; H04W 8/30; H04L 1/22; H04L 12/2803; H04L 12/40176; H04L 41/06; H04L 41/0654;
(Continued)

(56) References Cited

U.S. PATENT DOCUMENTS

| | | | |
|---|---|---|---|
| 2016/0015471 A1* | 1/2016 | Piron | A61B 1/045 600/424 |
| 2016/0379504 A1* | 12/2016 | Bailey | G08B 21/0476 |

(Continued)

OTHER PUBLICATIONS

"Biometrics" by Wikipedia, The Fee Encyclopedia; https://en.wikipedia.org/w/index.php?title=Biometrics&oldid=1161511212; Jun. 23, 2023, pp. 1-18.
(Continued)

*Primary Examiner* — Christopher S Kelley
*Assistant Examiner* — Ana Picon-Feliciano
(74) *Attorney, Agent, or Firm* — ORBITIP, LLP (57) ABSTRACT

An integrated and intelligent surgical display system comprising: an image processing module couplable to at least one surgical camera and configured for receiving images from the at least one surgical video camera; a processor coupled to the image processor, the processor being couplable to a network; an audio subsystem coupled to the processor, the audio subsystem further comprising at least one microphone and at least one speaker; a visualization subsystem coupled to the processor, the visualization subsystem further comprising at least one camera; a display coupled to the image processing module and the processor; wherein the processor is configured to receive data from at least one of the audio subsystem and the visualization subsystem to authenticate a user; and wherein the display is configured to display images from the image processing module and on-screen information from the processor.

21 Claims, 6 Drawing Sheets

(58) Field of Classification Search
CPC . H04L 41/0659; H04L 41/0668; H04L 45/24; H04L 45/243; H04L 45/247; H04L 65/80; H04L 67/1001; H04L 69/40; H04L 67/1095; H04L 67/52
USPC .................................. 348/47; 714/2, 3, 4.1
See application file for complete search history.

(56) References Cited

U.S. PATENT DOCUMENTS

| | | | |
|---|---|---|---|
| 2018/0197624 A1* | 7/2018 | Robaina | G06F 16/2379 |
| 2018/0227369 A1* | 8/2018 | DuCray | G16H 40/20 |
| 2019/0183591 A1* | 6/2019 | Johnson | B25J 9/1666 |
| 2021/0076966 A1* | 3/2021 | Grantcharov | G06F 16/7867 |
| 2022/0313338 A1* | 10/2022 | Carroll | G06F 1/266 |

OTHER PUBLICATIONS

International Search Report and Written Opinion, dated May 22, 2023, pp. 1-17.

* cited by examiner

INTELLIGENT SURGICAL DISPLAY SYSTEM AND METHOD

CROSS REFERENCE TO RELATED APPLICATION

This application claims priority to U.S. Provisional Patent Application No. 63/311,916, filed on Feb. 18, 2022, entitled INTELLIGENT SURGICAL DISPLAY SYSTEM AND METHOD, the entire contents of which are hereby incorporated herein by reference.

BACKGROUND

The present disclosure relates to devices used in surgery and, more particularly, to interactive and intelligent surgical display devices.

Technology has enhanced surgery but has also made it more complicated. Moreover, in order to maximize profits, surgeons are facing increasing pressures to be as efficient as possible and to obtain the best clinical outcomes in the shortest amount of time. Surgeons have to juggle between directing and coordinating support staff, collecting and synthesizing operating room information, and delivering patient care. Often a surgeon has several different touch control panels to deal with complex machines as well as control pedals on the floor. Commonly, surgeons have to use printed patient records and radiological data. There is therefore a need for a system and method that minimizes the distractions of directing and coordinating support staff and collecting and synthesizing operating room information so that a surgeon can better focus on patient care. Additionally, there is a need for a system and method that allows for secure authentication and tracking of operating room personnel.

SUMMARY

The present application is directed to an integrated, interactive, and intelligent surgical display system that remedies the shortcomings of the prior art. In an implementation, a surgical display system has: an image processing module couplable to at least one surgical camera and configured for receiving images from the at least one surgical video camera; a processor coupled to the image processor, the processor being couplable to a network. The display system also has an audio subsystem coupled to the processor, the audio subsystem further comprising at least one microphone and at least one speaker; a visualization subsystem coupled to the processor, the visualization subsystem further comprising at least one camera; and a display coupled to the image processing module and the processor. The processor is configured to receive data from at least one of the audio subsystem and the visualization subsystem to authenticate a user. The display is configured to display images from the image processing module and on-screen information from the processor.

Optionally, the system is configured to alter the size and position of displayed images from the image processing module and the on-screen information depending on operation context or workflow state. The image processing module may have at least one input from the group consisting of: an HDMI interface, a DisplayPort interface, a Serial Digital Interface and video over IP network interface for receiving images from the at least one surgical camera. The image processing module may have at least one output from the group consisting of: an HDMI interface, a DisplayPort interface and a Serial Digital Interface for transmitting images to the display. The display may be a two dimensional display or a three dimensional display. The display may be a touchscreen.

Optionally, the audio subsystem comprises at least two microphones; and the visualization system comprises at least two cameras. The visualization system may have stereo cameras or cameras for forming a three dimensional image. Additionally, one of the at least two cameras may be a time of flight (TOF) camera. The processor may have at least one network interface from the group consisting of: a wired network interface, a wireless network interface and a cellular network interface.

Optionally, the processor is configured to encode video and communicate video through the at least one network interface. Optionally, the processor is configured to receive video through the at least one network interface and communicate the received video to the image processing module for display. In an implementation, the processor has a Bluetooth connection for coupling the intelligent surgical display system to at least one of input devices, display device, and portable computing devices.

The processor may be configured to communicate with a user database through the at least one network interface and obtain user specific settings for surgical devices or operating room parameters. The processor may also be configured to identify and track each of the people in an operating room. The processor may also be configured to automatically download authenticated user settings for at least one of: operating room music, operating room temperature, operating room lighting, and operating room humidity. In an implementation, the system 10 also has a temperature sensor coupled to the processor; a humidity sensor coupled to the processor; and a smoke sensor coupled to the processor; and the processor is configured to record images from the at least one surgical camera, images from the visualization subsystem, audio from the audio subsystem and information from at least one of the temperature sensor, humidity sensor and smoke sensor during a surgical procedure In an implementation, a surgical display system has: an image processing module couplable to at least one surgical camera and configured for receiving images from the at least one surgical video camera and modifying the received images for display; and a processor coupled to the image processing module, the processor being couplable to a network and configured for running a plurality of apps and for providing on-screen information for display. The system also has an audio subsystem coupled to the processor, the audio subsystem having at least two microphones and at least one speaker. The system also has a visualization subsystem coupled to the processor, the visualization subsystem having at least two cameras. The system also has a touchscreen display coupled to the image processing module and the processor. The system is configured to alter the size and position of the displayed images from the image processing module and the on-screen information depending on operation context or workflow state.

In an implementation, the system is configured to display surgical images received by the image processing module regardless of whether the processor is operational. In an implementation, the image processor has at least two network interfaces from the group consisting of: a wired network interface, a wireless network interface, and a cellular network interface; and the system is configured for redundant network connectivity in case of an outage.

These and other features are described below.

BRIEF DESCRIPTION OF THE DRAWINGS

The features, aspects and advantages of the present invention will become better understood with regard to the following description, appended claims and accompanying figures wherein:

DETAILED DESCRIPTION

In the following description of the preferred implementations, reference is made to the accompanying drawings which show by way of illustration specific implementations in which the invention may be practiced. Wherever possible, the same reference numbers will be used throughout the drawings to refer to the same or like parts. It is to be understood that other implementations may be utilized and structural and functional changes may be made without departing from the scope of this disclosure.

Figure 1:
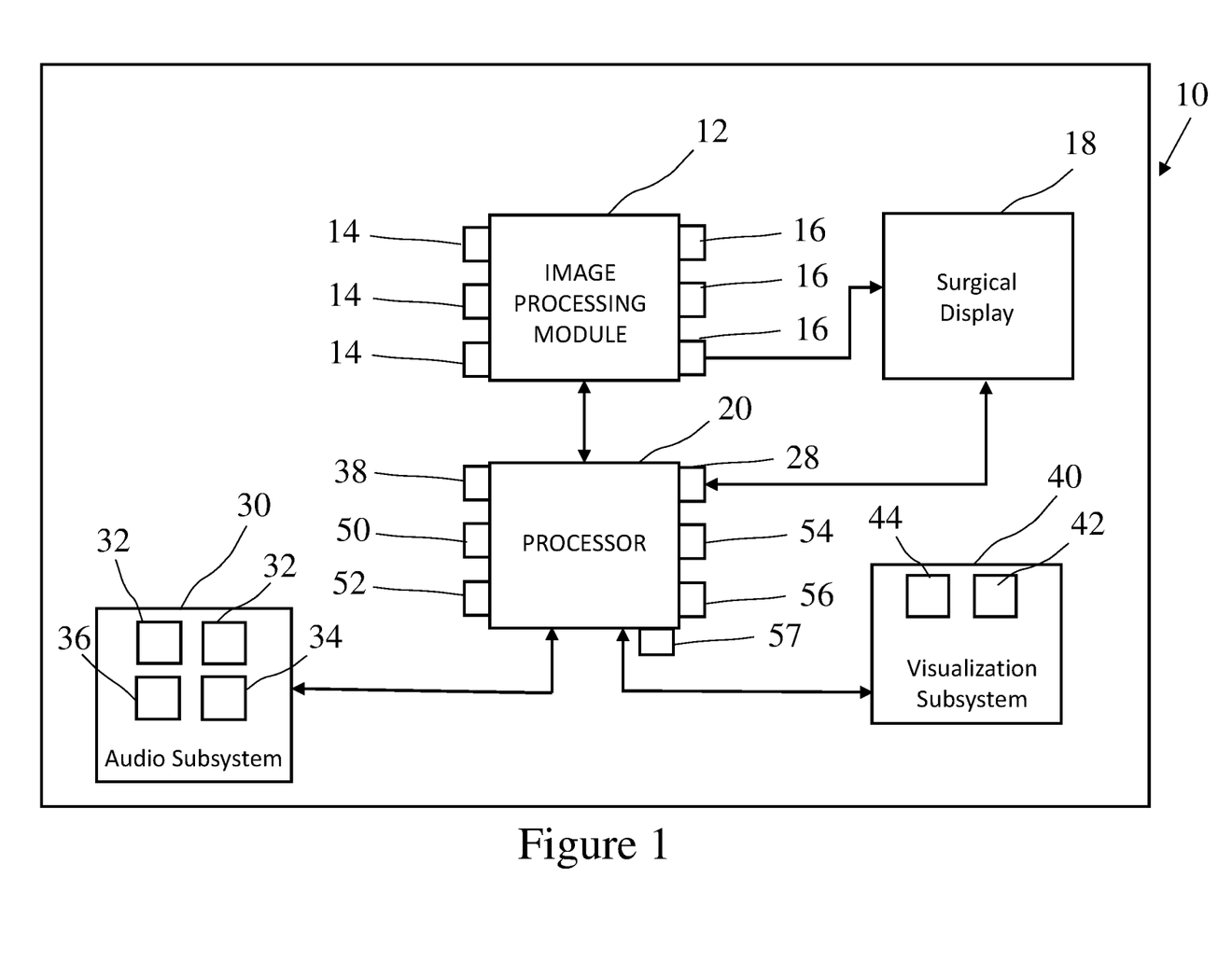
FIG. 1 is a schematic diagram of an intelligent surgical display device according to an implementation.
Figure 2:
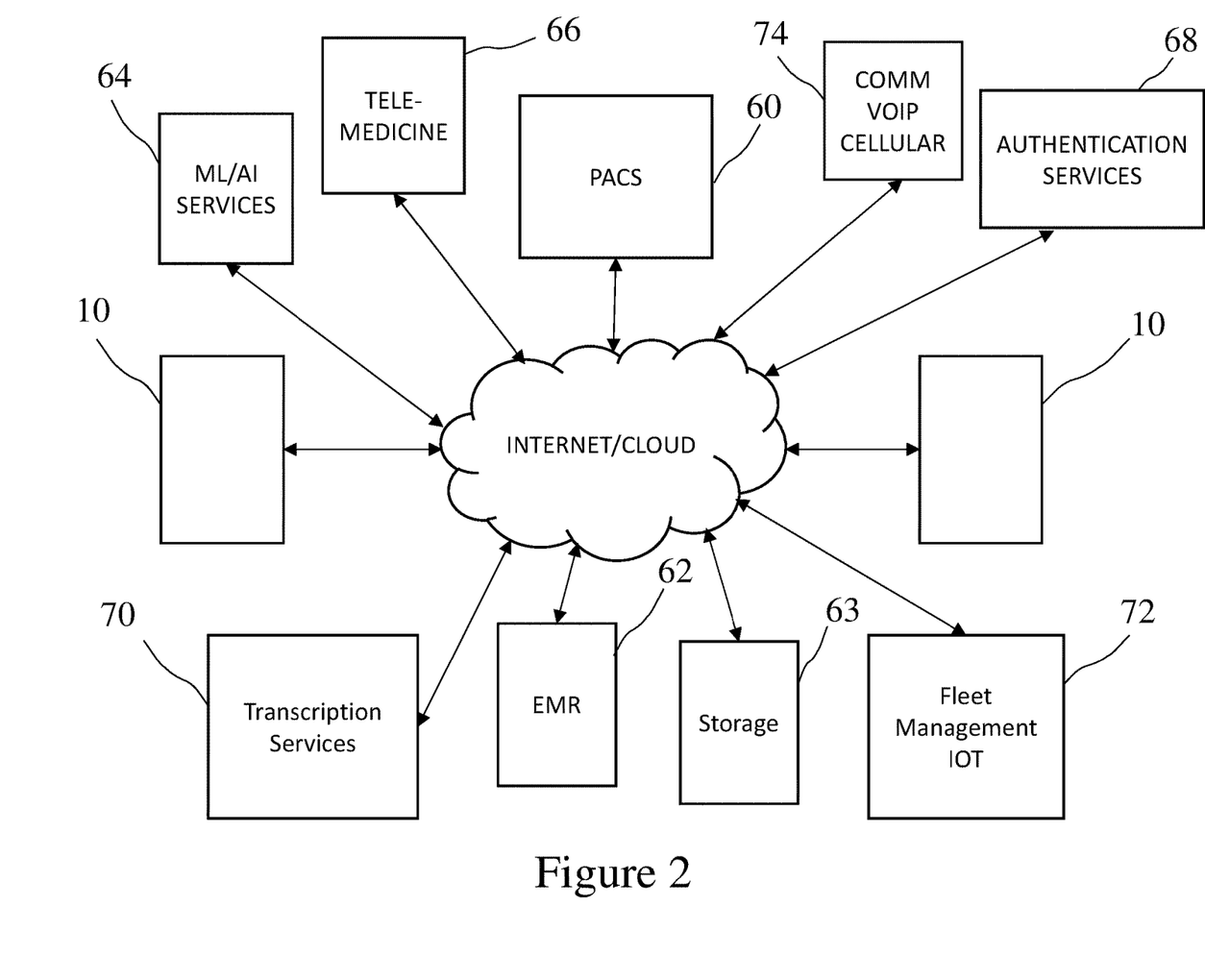
FIG. 2 is a schematic diagram of a system having two intelligent surgical display devices according to an implementation.

With reference to FIGS. 1 and 2 an intelligent surgical display system 10 will now be described. The intelligent surgical display system 10 has an image processing module (IPM) 12. The IPM may include a field programmable gate array (FPGA). At least one input 14 is coupled to the IPM 12 and the IPM is coupled to at least one output 16. The at least one input 14 may be from a surgical camera and may be, for example and without limitation an HDMI connector, Display Port connector, a Serial Digital Interface (SDI) connector, a video over IP network interface, or any other current or future connector.

In an implementation, at least one output 16 is an HDMI connector connected to a display 18. In additional implementations, the output 16 may have specific software and hardware for connecting a specific display. If desired, multiple displays can be provided. In an additional implementation, the IPM 12 may have an m.2PCIe output 16 which may provide a wireless video signal to a wearable device such as smart glasses or smart goggles. At least one output 16 may be an SDI connector. Additionally, at least one output may be to a memory device for storing a video. The IPM 12, may take video input from the at least one input 14 and pass the video straight to the at least one output 16 to ensure that a picture is always available for a surgeon on the display 18. In an implementation, the IPM 12 is configured to process a received surgical video with very low latency for an LCD display 18. For example, the IPM 12 may enhance the brightness and the contrast of received surgical video.

The IPM 12 is also coupled to a processor 20. The processor 20 may be, for example, a Jetson Orin NX by Nvidia. A video signal may be passed from the IPM 12 to the processor 20. The processor 20 may be used to augment the video signal and return the video signal to the IPM 12. For example, the processor 20 may add overlays and prompts to the video. Additionally, the processor 20 may receive speech input and translate the input to text that is displayed along with the video. Additionally, the processor 20 may allow for a videoconference to be displayed on a portion of the display screen(s) 18 along with the video. While the IPM 12 and the processor 20 are shown as separate units, they can be implemented as a single module.

The processor 20 is coupled to an audio subsystem 30 containing at least one microphone 32 and a visualization subsystem 40 containing at least one surgical display camera 42. The audio subsystem 30 and the visualization subsystem 40 are used in part for authentication and control as discussed further below.

The audio subsystem 30 may contain an array of microphones 32. In an implementation, the audio subsystem 30 contains two microphones 32 configured for stereo. In an implementation, the audio subsystem 30 contains five microphones 32. The microphones 32 may be positioned at various points along an outer edge of the intelligent surgical display 10. The microphones 32 may be configured to beam steer and cross noise cancel.

Additionally, the audio subsystem 30 may contain at least one speaker 34 and at least one amplifier 36 to provide power to the at least one speaker. In an implementation, the audio subsystem 30 contains two speakers 34 and subwoofer for typical Dolby 2.1 audio 34. The intelligent surgical display 10 may also have indicator lights 38. The indicator lights 38 may display status, such as for example, the status of internet connectivity and wireless network connectivity. Additionally, indicator lights 38 may be used to indicate that the intelligent surgical display 10 is receiving or understanding audio instructions from a user. The audio subsystem 30 can be used in conjunction with processor 20 to perform various functions, for example and without limitation for: voice control of the intelligent surgical display 10, audio prompts to a user, user feedback, alarm notifications, alarm detection, telemedicine, communication, and for playing music.

The visualization subsystem 40 may have multiple cameras 42. In an implementation, the visualization subsystem 40 has stereo cameras 42 for assisting with room situational awareness or facial recognition. In an implementation, at least one camera 44 is a time of flight camera. In an implementation, the visualization subsystem 40 has two cameras 42 for stereo imaging. In an additional implementation, the visualization subsystem 40 has two cameras for three dimensional image and video capture. The visualization subsystem 40 can be used in conjunction with the processor 20 for viewing the surroundings of the intelligent surgical display 10, such as an operating room. Additionally, the visualization subsystem 40 can be used in conjunction with the processor 20 to perform various function, for example and without limitation for: situational awareness, learning, training, telemedicine, and distance measurement.

Additionally, the processor 20 has a plurality of input/output interfaces. In an implementation, the processor 20 has a peripheral component interconnect port (PCI) 50 for coupling external devices. In an implementation, the processor 20 is coupled to the IPM 12 using a PCI interface. The processor 20 may also have a wired network interface 52 for connecting the intelligent surgical display 10 to a local area network, such as a network within a particular operating room or hospital, or a wide area network such as the Internet.

Additionally, the processor 20 may have a wireless network interface 54 for connecting the intelligent surgical display 10 to a local area network, such as a network within a particular operating room or hospital, or a wide area network such as the Internet. In an implementation, the wireless network interface 54 is Wi-Fi. In an implementation, the wireless network interface 54 is Bluetooth. Bluetooth may also be used to couple the intelligent surgical display 10 to Bluetooth compatible external devices including, for example, input devices such as mice and keyboards, display devices, and portable computing devices such as phones, tablets and laptops for exchanging information.

Additionally, the processor 20 may have a cellular interface 56, such as for a 5 g cellular network, for connecting the intelligent surgical display 10 to a local area network, such as a network within a particular operating room or hospital, or a wide area network such as the Internet. A cellular interface may be particularly important to communicate critical information in an emergency if a hospital network becomes inoperable.

Additionally, the processor 20 may have a secondary display interface 57 for connection to an additional display. The additional display may be a touchscreen and may allow for annotation of images, records, or reports, or may be usable for control of the surgical display system 10. The secondary display interface 57 may be, for example and without limitation, an HDMI, Display Port connector, or a Serial Digital Interface (SDI) connector. Additionally, the secondary display interface 57 may include a universal serial bus (USB) interface for touchscreen control.

As noted above, the intelligent surgical display 10 has numerous features. The intelligent surgical display 10 is configured for authenticating users using at least one form of biometric authentication. In an implementation, the authentication system utilizes voice recognition as sensed by the at least one microphone 32 and at least partial face identification as sensed by the at least one camera 42. Once authenticated, a user may be provided access to hospital records and the ability to interact with other surgical displays. This ease of use is a significant advantage and improvement over prior art surgical systems and displays.

As shown in FIG. 2, the intelligent surgical display 10 may be linked to hospital networks, databases, and outside data processing through one of the network interfaces 52, 54, 56. Once a user is authenticated, then information specific to that user, and to patients in the operating room, may automatically be gathered. For example, the intelligent surgical display 10 may be linked to a picture archiving and communication system (PACS) 60 either inside or outside of a hospital for obtaining or storing patient information. Additionally, the intelligent surgical display may be linked to an electronic medical record (EMR)/electronic health record (HER) server 62 either inside or outside of a hospital for obtaining or storing patient information. Additionally, the intelligent surgical display may be linked to a cloud based storage system 63.

Additionally, the intelligent surgical display 10 may be linked to external data processing systems and applications through one of the network interfaces 52, 54, 56. The ability to link to external data storage and processing systems and applications allows for deeper artificial intelligence and machine learning functions. For example, if a voice command is received asking the intelligent surgical display to "turn the lighting all the way up", then the command may be processed by an external application and a command returned to the intelligent surgical display to turn the lighting to 100%. The intelligent surgical display 10 may be linked to cloud or local services via applications (apps) resident on the intelligent surgical display 10. The intelligent surgical display 10 may learn locally or through machine learning cloud services based on the events in the operating room and provide guidance about the events in the surgical suite to users and administrators via artificial intelligence.

Referring to FIG. 2, in an implementation, the intelligent surgical display 10 may be linked to machine learning and/or artificial intelligence applications and services 64. Additionally, the intelligent surgical display 10 may be linked to telemedicine services 66. Additionally, the intelligent surgical display 10 may be linked to external authentication services 68 as well as external transcription services 70 and external fleet management services 72. Additionally, the intelligent surgical display 10 may be linked to external communication services 74 such as voice over internet protocol (VOIP) and cellular communications.

Figure 3A:
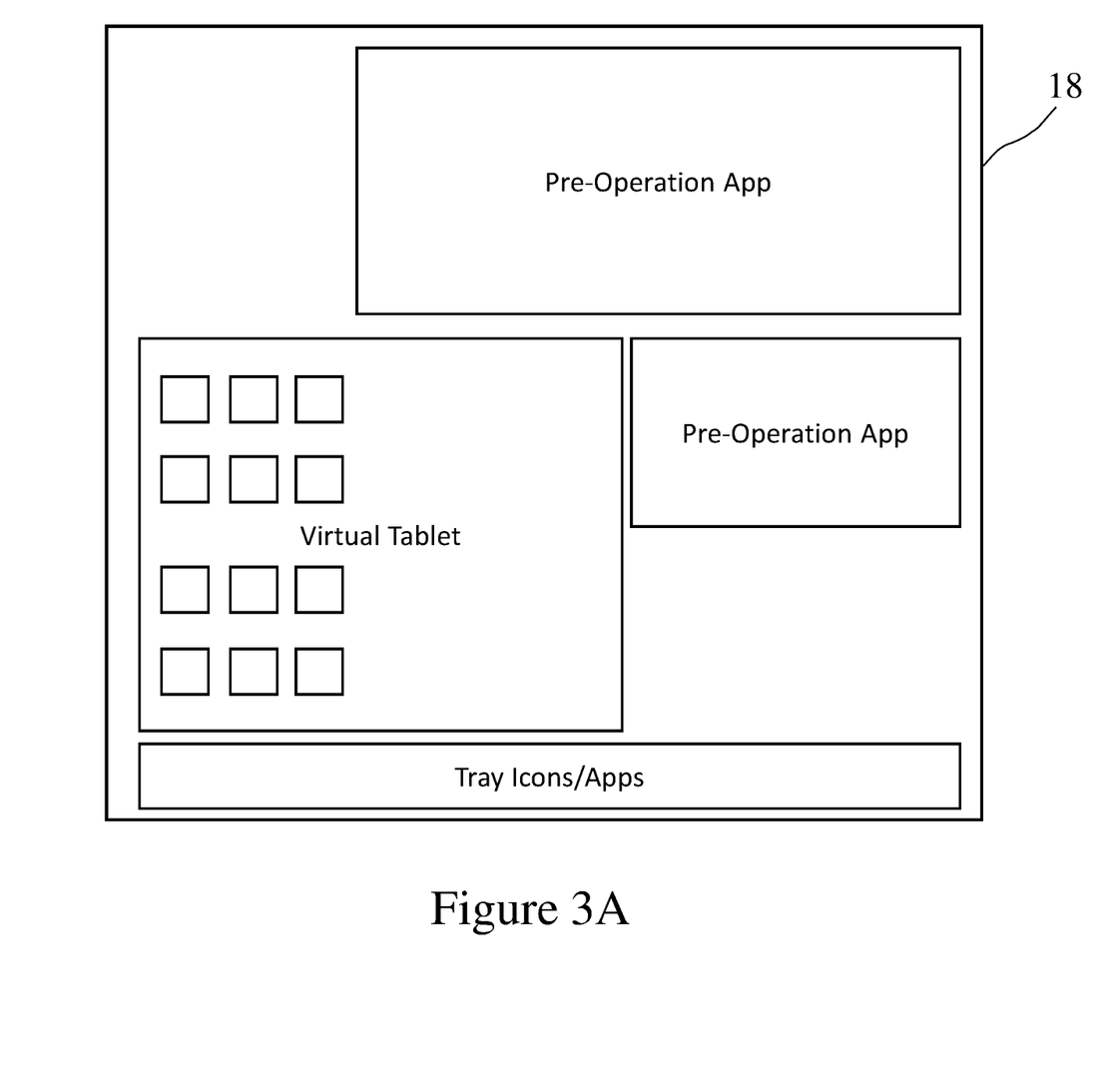
FIG. 3A is a schematic diagram of a display screen in a pre-operative state according to an implementation.

Additionally, a user may also be able to control several different aspects of the operating room environment. The user may be able to exercise that control using one or more of: voice commands, gestures as sensed by at least on camera, built in user input devices, and user input devices coupled to the intelligent surgical display 10. In an implementation, the display 18 is a touch screen coupled to the processor 20 such as by a universal serial bus (USB) interface 28. In an implementation, as shown in FIG. 3A, when a user touches the display 18 configured as a touchscreen, some predetermined portion of the screen simulates a virtual tablet interface for the user.

The processor may be used by a user may be able control music in the operating room. The user may also be able to set timers and a stop watch function. The user may be able to control operating room or surgical lighting. The user may be able to control surgical devices, such as shavers, pumps and cameras that are coupled to the intelligent surgical display. The user may be able to control temperature and humidity settings within the operating room. The intelligent surgical display 10 may have temperature and humidity sensors for automatically controlling the temperature and humidity within the operating room based on a preset temperature and humidity. The intelligent surgical display 10 may have also have a smoke sensor.

Additionally, a user may be able to communicate with others either through additional surgical displays, or through phones, tablets or computers in communication with the intelligent surgical display 10, such as in other operating rooms, nurses' stations, or such as technical support personnel for surgical devices. Referring back to FIG. 1, the processor 20 may encode video and send the video out over one of the network interfaces 52, 54, 56 to a viewer inside or outside of a hospital. Additionally, the processor 20 may receive a video stream over one of the network interfaces 52, 54, 56 and communicate the video stream to the IPM 12 for display on at least a portion of the display 18. This may be useful, such as for videoconferencing during a procedure.

The intelligent surgical display 10 may provide access to a user's schedule and to an operating room schedule. Using at least one camera, the intelligent surgical display 10 may be able to identify and track each of the people in the operating room as well as when each person enters and exits. This may include entry and exit of a patient. The intelligent surgical display 10 may automatically control elements of the operating room environment, such as music, lighting, temperature and humidity based on pre-saved preferences of the authenticated user. Additionally, the intelligent surgical display 10 may display instructions and surgical procedure steps for the authenticated user. The intelligent surgical display 10 may also record video and audio of a surgical procedure as a record of the procedure, for producing reports and for training purposes. The intelligent surgical display 10 can capture and record video and audio of the surgery from either the surgical camera feed or from the visualization subsystem 40.

With reference to FIG. 2, intelligent surgical displays 10 described herein, can be used in place of surgical portals. For example, a first intelligent surgical display 10 may be placed in an operating room and a second intelligent surgical display 10 may be placed in a remote location, such as, for example and without limitation, a nurses' station, another operating room, or another hospital. The two intelligent surgical displays 10 may be connected over a network, such as a local area network such as a hospital network, a wide area network such as the Internet or a cellular network (such as 5G). Such a configuration allows for a remote user to see and hear things taking place in the operating room. The intelligent surgical display 10 can be used for room to room communications, and communications outside the hospital. However, there are practically no limits to the number intelligent surgical displays 10 that can be linked together.

The architecture of the intelligent surgical display 10 is flexible and is designed for applications (apps) designated or authorized by user or institution requirements. The intelligent surgical display 10 may be configured using an integral touchscreen, mobile app or web browser. Also, while the IPM 12 and the processor 20 are shown as separate units, they can be implemented as a single module. The same applies to other subsystems such as the audio subsystem 30 and the visualization subsystem 40 which could be integrated as desired.

Figure 3B:
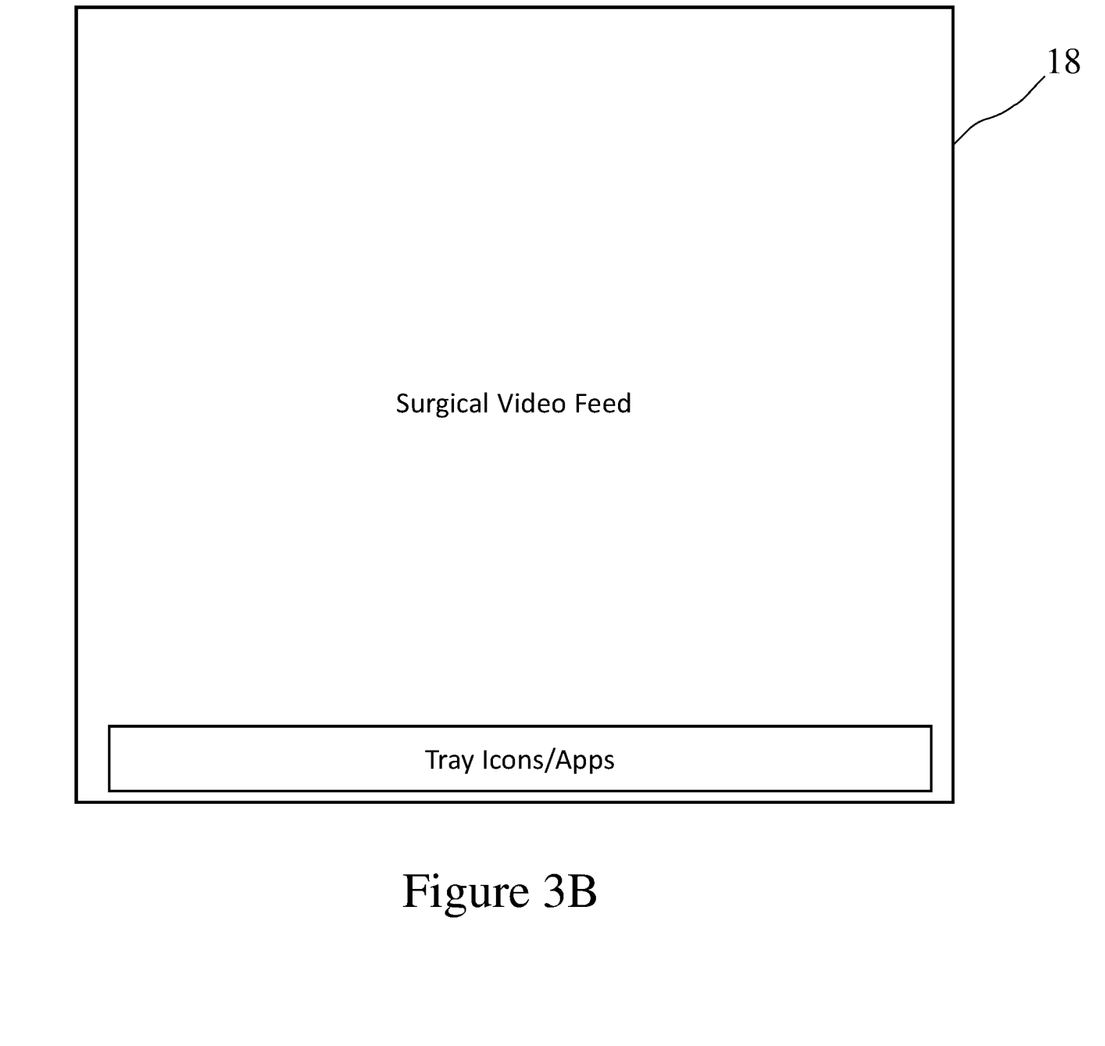
FIG. 3B is a schematic diagram of a display screen in a operative state according to an implementation.
Figure 3C:
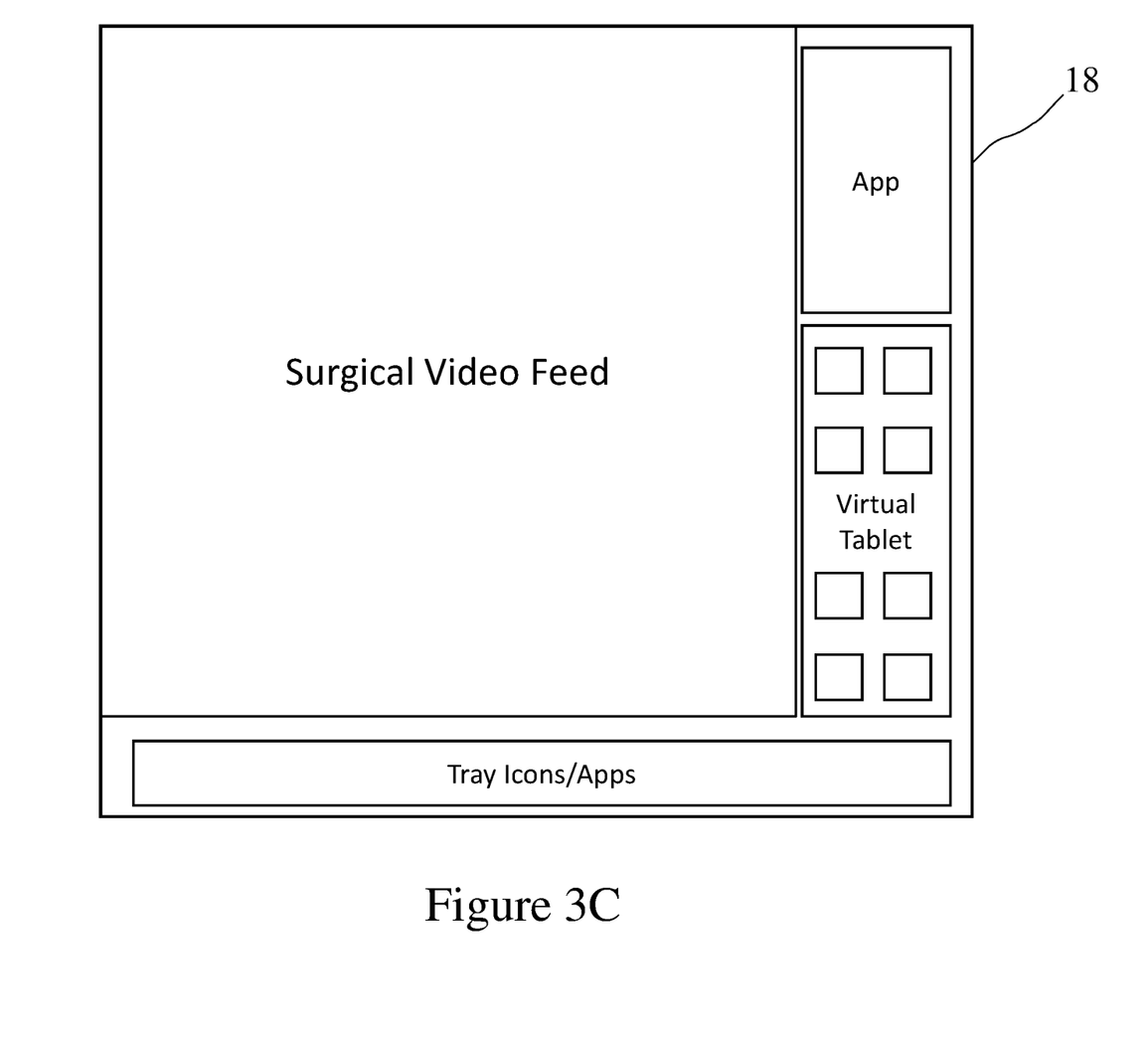
FIG. 3C is a schematic diagram of a display screen in a operative state according to another implementation.
Figure 3D:
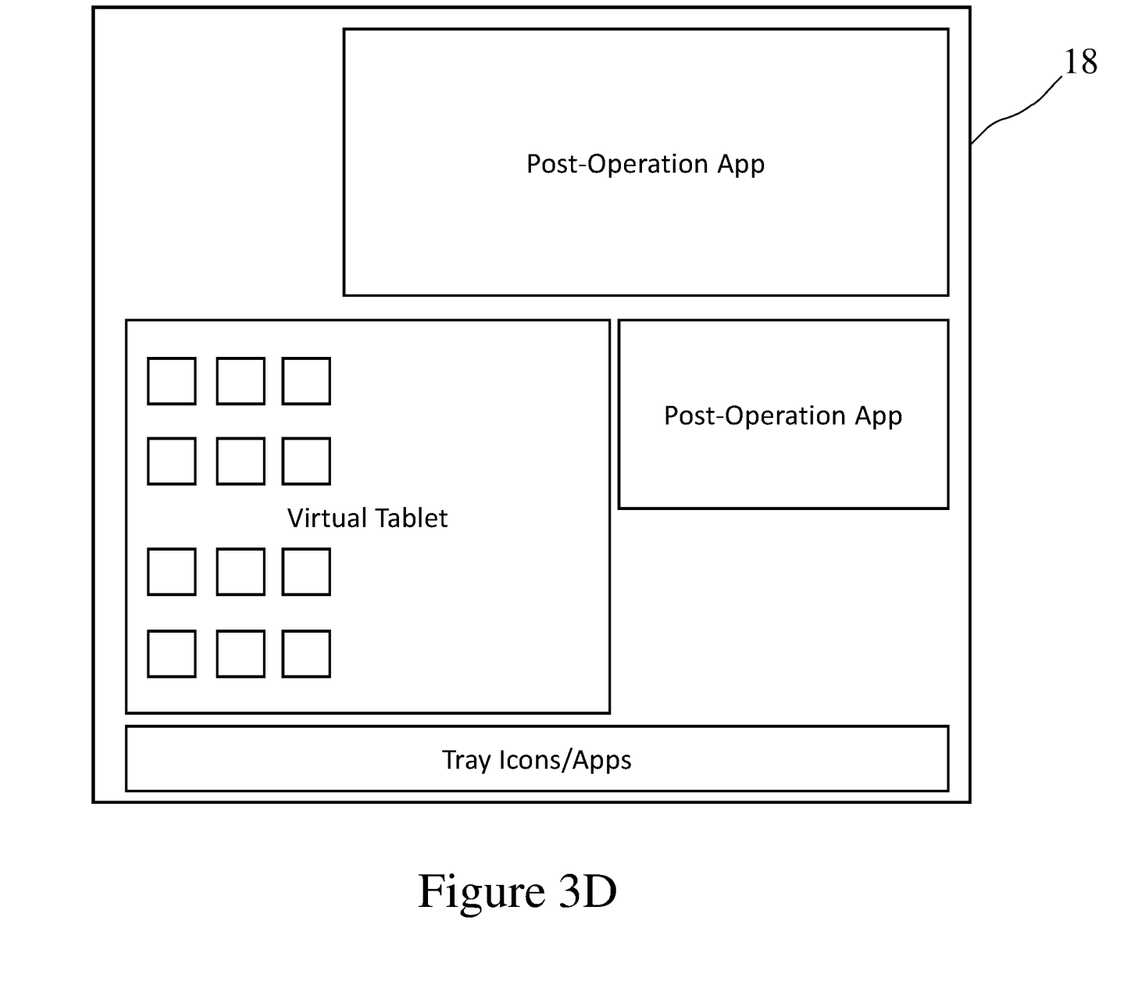
FIG. 3D is a schematic diagram of a display screen in a post-operative state according to an implementation

In implementations, as shown in FIGS. 3A, 3B, 3C and 3D, the surgical display 18 manages and control modes of displaying content based on operational context or workflow state. A goal is to provide priority to the presentation of an uninterrupted, low latency surgical video feed by altering the size and position of any additional on screen display elements. For example, there may be three defined workflow states: a pre-operation state (FIG. 3A), an intra-operation state (FIGS. 3B and 3C), and a post-operation state (FIG. 3D). During the pre & post-operation states the surgical display 10 allows the entire screen to be available for the display of a virtual tablet and selected applications (apps). For example, and without limitation, in a pre-operation state a user may select and use apps to display surgeon preference cards, to play music, and to review patient records. For example, and without limitation, in a post-operation state a user may select and use apps to save surgical photos and video and to generate surgical reports.

During the intra-operation state, when a live surgical video feed is connected to the device, the display options are limited in order to protect the surgical video from being obscured by other on screen content. In a first implementation of an intra-operation state, as shown in FIG. 3B, overlay content is only presented at the bottom of the display, in a tray. In an additional implementation of an intra-operation state, as shown in FIG. 3C, the surgical video feed is scaled in order to present it unobstructed, while some display space on the side of the screen is reserved for the display of a virtual tablet and selected apps. In the intra-operation state it is critical that the live surgical video feed remains on the display 18 and the system is configured so that the live surgical video feed is passed to the display regardless of any other functionality.

In an implementation, the display system 10 may determine that an operation has begun by detecting connection of a surgical camera. Additionally, the display system 10 may determine that an operation has begun by detecting the presence of a surgeon or patient using the visualization sub system 40.

The intelligent surgical display system as described is greater than the sum of its parts and may function as an intelligent robot without arms and legs. The intelligent surgical display system can see, hear, speak and understand what is going on in the room; and can also transmit what it is seeing remotely.

There is disclosed in the above description and the drawings, an intelligent surgical display that fully and effectively overcomes the disadvantages associated with the prior art. However, it will be apparent that variations and modifications of the disclosed implementations may be made without departing from the principles of the invention. The presentation of the implementations herein is offered by way of example only and not limitation, with a true scope and spirit of the invention being indicated by the following claims.

Any element in a claim that does not explicitly state "means" for performing a specified function or "step" for performing a specified function, should not be interpreted as a "means" or "step" clause as specified in 35 U.S.C. § 112.

What is claimed is:

1. A surgical display system comprising:
   an image processing module couplable to at least one surgical camera and configured for receiving images from the at least one surgical video camera;
   a processor coupled to the image processing module, the processor being couplable to a network;
   an audio subsystem coupled to the processor, the audio subsystem further comprising at least one microphone and at least one speaker;
   a visualization subsystem coupled to the processor, the visualization subsystem further comprising at least one camera; and
   a display coupled to the image processing module and the processor;
   wherein the processor is configured to receive data from both the audio subsystem and the visualization subsystem to authenticate a user;
   wherein the display is configured to display images from the image processing module and on-screen information from the processor; and
   wherein the image processor further comprises at least one wired network interface or at least one wireless network interface; and at least one cellular network interface; and wherein the system is configured for redundant network connectivity with cellular backup in case of a network outage.

2. The surgical display system of claim 1 wherein the system is configured to alter the size and position of displayed images from the image processing module and the on-screen information depending on operation context or workflow state.

3. The surgical display system of claim 1 wherein the image processing module further comprises at least one input from the group consisting of: an HDMI interface, a DisplayPort interface a Serial Digital Interface and video over IP network interface for receiving images from the at least one surgical camera.

4. The surgical display system of claim 3 wherein the image processing module further comprises at least one output from the group consisting of: an HDMI interface, a DisplayPort interface and a Serial Digital Interface for transmitting images to the display.

5. The surgical display system of claim 1 wherein the display is a two dimensional display or a three dimensional display.

6. The surgical display system of claim 1 wherein the audio subsystem comprises at least two microphones; and wherein the visualization system comprises at least two cameras.

7. The surgical display system of claim 6 wherein the visualization system further comprises stereo cameras or cameras for forming a three dimensional image.

8. The surgical display system of claim 1 wherein the processor is configured to encode video and communicate video through the at least one wired network interface; the at least one wireless network interface; and the at least one cellular interface.

9. The surgical display system of claim 1 wherein the processor is configured to receive video through the at least one wired network interface; the at least one wireless network interface; and the at least one cellular interface and communicate the received video to the image processing module for display.

10. The surgical display system of claim 1 wherein the processor is configured to communicate with a user database through the at least one network interface and obtain user specific settings for surgical devices or operating room parameters.

11. The surgical display system of claim 10 wherein the processor is configured to identify and track each of the people in an operating room.

12. The surgical display system of claim 10 wherein the processor is configured to automatically download authenticated user settings for at least one of: operating room music, operating room temperature, operating room lighting, and operating room humidity.

13. The surgical display system of claim 1 further comprising:
a temperature sensor coupled to the processor;
a humidity sensor coupled to the processor; and
a smoke sensor coupled to the processor; and
wherein the processor is configured to record images from the at least one surgical camera, images from the visualization subsystem, audio from the audio subsystem and information from at least one of the temperature sensor, humidity sensor and smoke sensor during a surgical procedure.

14. A surgical display system comprising:
an image processing module couplable to at least one surgical camera and configured for receiving images from the at least one surgical video camera and modifying the received images for display;
a processor coupled to the image processing module, the processor being couplable to a network and configured for running a plurality of apps and for providing on-screen information for display;
an audio subsystem coupled to the processor, the audio subsystem further comprising at least two microphones and at least one speaker;
a visualization subsystem coupled to the processor, the visualization subsystem further comprising at least two cameras; and
a touchscreen display coupled to the image processing module and the processor;
wherein the system is configured to alter the size and position of the displayed images from the image processing module and the on-screen information depending on operation context or workflow state; and
wherein the image processor further comprises at least one wired network interface or at least one wireless network interface; and at least one cellular network interface; and wherein the system is configured for redundant network connectivity with cellular backup in case of a network outage.

15. The surgical display system of claim 14 wherein the system is configured to display surgical images received by the image processing module regardless of whether the processor is operational.

16. The surgical display system of claim 14 wherein the processor is configured to receive data from both the audio subsystem and the visualization subsystem to authenticate a user.

17. The surgical display system of claim 14 wherein the plurality of apps link to at least one of cloud services and local services.

18. The surgical display system of claim 17 wherein the cloud services comprise artificial intelligence and machine learning functions.

19. The surgical display system to claim 17 wherein the plurality of apps comprise at least one of the groups consisting of: pre-operation related apps and post-operation related apps.

20. The surgical display system to claim 19 wherein the plurality of apps comprise at least one of the groups consisting of: telemedicine services, authentication services, transcription services and fleet management services.

21. The surgical display system of claim 14 wherein the system is configured to present a virtual tablet interface.

* * * * *